(12) United States Patent
Christensen et al.

(10) Patent No.: US 7,185,060 B2
(45) Date of Patent: Feb. 27, 2007

(54) MESSAGE PROCESSING PIPELINE FOR STREAMS

(75) Inventors: Erik B. Christensen, Seattle, WA (US); Douglas A. Walter, Issaquah, WA (US); Michael J. Coulson, Clyde Hill, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 10/401,220

(22) Filed: Mar. 26, 2003

(65) Prior Publication Data

US 2004/0193687 A1 Sep. 30, 2004

(51) Int. Cl.
*G06F 15/16* (2006.01)
(52) U.S. Cl. .................. 709/206; 709/219; 709/229; 719/310; 719/332
(58) Field of Classification Search ................ 709/318, 709/202, 206, 315, 219, 229; 719/310, 332
See application file for complete search history.

(56) References Cited

U.S. PATENT DOCUMENTS

| | | | |
|---|---|---|---|
| 5,402,416 A | 3/1995 | Cieslak et al. ................ 370/60 |
| 5,675,737 A | 10/1997 | Horie et al. ............ 395/200.07 |
| 5,918,020 A | 6/1999 | Blackard et al. ........ 395/200.58 |
| 5,966,663 A * | 10/1999 | Gleason ...................... 455/466 |
| 5,983,259 A | 11/1999 | Campbell et al. ........... 709/200 |
| 6,038,604 A | 3/2000 | Bender et al. .............. 709/233 |
| 6,226,666 B1 * | 5/2001 | Chang et al. ............... 709/202 |
| 2002/0118640 A1 | 8/2002 | Oberman et al. ........... 370/230 |
| 2002/0191616 A1 * | 12/2002 | Sarmiento et al. .......... 370/400 |
| 2003/0105884 A1 * | 6/2003 | Upton ........................ 709/318 |
| 2005/0149612 A1 * | 7/2005 | Messinger et al. .......... 709/200 |

FOREIGN PATENT DOCUMENTS

WO    WO 00/10302    2/2000

OTHER PUBLICATIONS

Dalton, Chris; Watson, Greg; Banks, David; Calamvokis, Costas; Edwards, Aled; and Lumley, John; "AFTERBURNER," IEEE Network, Jul. 1993, vol. 7, No. 4, pp. 36-43.

Branstad, Martha and Landauer, Jaisook; "Assurance for the Trusted Mach Operating System," COMPASS '89 Proceedings of the Fourth Annual Conference on Computer Assurance, Systems Integrity, Software Safety and Process Security, Jun. 19-23, 1989, pp. 103-108.

(Continued)

*Primary Examiner*—Rupal Dharia
*Assistant Examiner*—Djenane Bayard
(74) *Attorney, Agent, or Firm*—Workman Nydegger (57) ABSTRACT

Methods, systems, and computer program products that reduce buffer requirements in a messaging system so that the messaging system can send or receive relatively larger messages using a given buffer size. Message handlers are provided, each identifying a corresponding processing operation to perform on a message object having a streamed portion with a stream oriented interface. Pipelines comprising ordered collections of the message handlers are provided as well. The message object is processed by the message handlers in the message pipelines, such that at least one message handler encapsulates the streamed portion of the message object with its corresponding processing operation. The corresponding processing operation is to be performed at a future time, and encapsulates the streamed portion of the message object without materializing the stream portion in a buffer. The messaging system may be an intermediary for routing a message object or an endpoint.

39 Claims, 9 Drawing Sheets

OTHER PUBLICATIONS

Nelson, Michael and Ousterhout, John; "Copy-on-Write for Sprite," Proceedings of the Summer 1988 USENIX Conference, Jun. 20-24, pp. 187-201.

Dongseung Kim; Seung-Hoon Kim; and Jong Kim; "Fast SIMD Algorithms on a Mesh with Wormhole Routing," Transputer Applications and Systems '94, Proceedings of the 1994 World Transputer Congress, Sep. 5-7, 1994, pp. 247-258.

Wittevrongel, Sabine and Bruneel, Herwig; "Correlation effects in ATM queues due to data format conversions," *Performance Evaluation*, Feb. 1998, vol. 32, No. 1, pp. 35-56.

Bar-Noy, Amotz; Raghavan, Prabhakar; Schieber, Baruch; and Tamaki, Hisao; "Fast Deflection Routing for Packets and Worms," Proceedings of the Twelfth Annual ACM Symposium on Principles of Distributed Computing, Aug. 15-18, 1993, pp. 75-86.

Brachman, Barry J. and Chanson, Samuel T.; "A Simulation Study of Application Level Message Transfer Using Message Streams," *Computer Networks and ISDN Systems*, Oct. 1990, vol. 19, No. 3, pp. 79-94.

Caraveo, Shane; "Writing SMTP-Based SOAP Messages in PHP," *Windows Developer Magazine*, Oct. 2002, vol. 13, No. 10, pp. 24, 26-31.

"Tru64 UNIX Streams," <http://h30097.www3.hp.com/docs/base_doc/DOCUMENTATION/V50_HTML/ARH9UATE/STRMSXXX.HTM>, visited May 20, 2003.

* cited by examiner

MESSAGE PROCESSING PIPELINE FOR STREAMS

CROSS-REFERENCE TO RELATED APPLICATIONS

N/A

BACKGROUND OF THE INVENTION

1. The Field of the Invention

The present invention relates to message processing. More particularly, the present invention relates to methods, systems, and computer program products that reduce buffer requirements for processing messages and therefore allow a messaging system to send or receive relatively larger messages using a given buffer size.

2. Background and Related Art

Message processing occurs in a variety of contexts, including distributed application support, within communication protocols generally, etc. One of the problems that message processing systems continually face relates to processing messages of unbounded size. Conventional message processing systems typically buffer messages of a reasonable size, but large messages lead to unpredictable and perhaps massive memory requirements, unless rejected. Large is a relative term and depends in part on the message processing system itself. But as network speeds have increased, message size has increased as well, particularly given the popularity of exchanging multimedia and graphic content. While in terms of network bandwidth, multiple megabyte messages may no longer represent much of a problem, when processing considerations are taken into account, including both memory and processing time, a multiple megabyte message can represent a significant strain on messaging systems, especially if they are received on a somewhat regular basis.

Of course, computers with ever increasing processing power and available memory become less expensive everyday, mitigating some of the resource demands caused by large messages. Given hardware advancements over the past few years, one approach might include increasing available buffer size and processing speed to account for larger messages. Most messages tend to be comparatively small, so one line of reasoning suggests that an occasional large message does not represent much of a problem.

There are at least two considerations that this line of reasoning fails to consider. First and foremost is the premise that large messages will only arrive occasionally. There is always the possibility that a messaging system will be subject to a denial of service attack. In general, a denial of service attack attempts to overwhelm a piece of hardware with requests that take longer for the receiving computer to process than for the sending computer or computers to generate. Sending large messages to a message processing system is a logical starting place for a malicious denial of service attack, and therefore presuming that large messages will be received only occasionally is a dangerous strategy for dealing with large messages. Second, many message processing systems operate at near capacity from time to time, so the possibility of a large message arriving at a busy time cannot be ignored.

Due to these and other problems found in traditional messaging systems, methods, systems, and computer program products for reducing buffer requirements when processing messages so that a messaging system can send or receive relatively larger messages using a given buffer size are desired.

BRIEF SUMMARY OF THE INVENTION

The present invention relates to methods, systems, and computer program products that reduce buffer requirements in a messaging system so that the messaging system can send or receive relatively larger messages using a given buffer size. In accordance with example embodiments of the present invention which are described more fully below, a messaging system sends messages to or receives messages from an endpoint via one or more message transports. The messaging system may be an intermediary for routing a message object or an endpoint that sends and receives messages.

In one example embodiment, one or more message handlers are provided, each of which identifies a corresponding processing operation to perform on a message object. The message object includes a streamed portion with a stream oriented interface. For managing the one or more message handlers as an ordered collection, a pipeline is provided as well. The message object is processed by the one or more message handlers in the message pipeline, such that at least one message handler encapsulates the streamed portion of the message object with its corresponding processing operation. The corresponding processing operation is to be performed at a future time, and encapsulates the streamed portion of the message object without materializing the streamed portion in a buffer. In some embodiments, multiple pipelines, including nested pipelines, for processing the message object with various message handlers may be provided.

If the pipeline comprises a plurality of message handlers, each of the handlers may successively wrap the streamed portion such that the processing operations corresponding to the message handlers are layered on the stream portion of the message object. The message object may include one or more header portions, one or more body portions, and one or more attachment portions, with at least the body and/or attachment portions generally including the streamed portion of the message object.

In example embodiments, the message object may be, for example, a Simple Object Access Protocol (SOAP) message. To route and otherwise process a SOAP message, headers for the message may be buffered or materialized for access, without having to materialize the streamed portion. The routing may include duplicating the message object for delivery to a plurality of endpoints.

Calling the one or more message handlers of the message pipeline may occur prior to a stream being assigned to the stream portion of the message object. Because the stream portion does not have to be materialized when the message handlers are called, the processing operations of message handlers within the pipeline may be identified for the message first, and then the actual stream on which the operations will be performed may be assigned to the stream portion of the message object at a later time. Sending the message object to or receiving the message object from another endpoint may cause the processing operations encapsulating the streamed portion to be performed on the streamed portion.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for processing a message object that reduces buffer requirements for at least a portion of the message object. By reducing buffer requirements, the present invention allows a messaging system to send or receive relatively larger messages using a given buffer size than otherwise would be possible. The embodiments of the present invention may comprise one or more special purpose and/or one or more general purpose computers including various computer hardware, as discussed in greater detail below.

Figure 1:
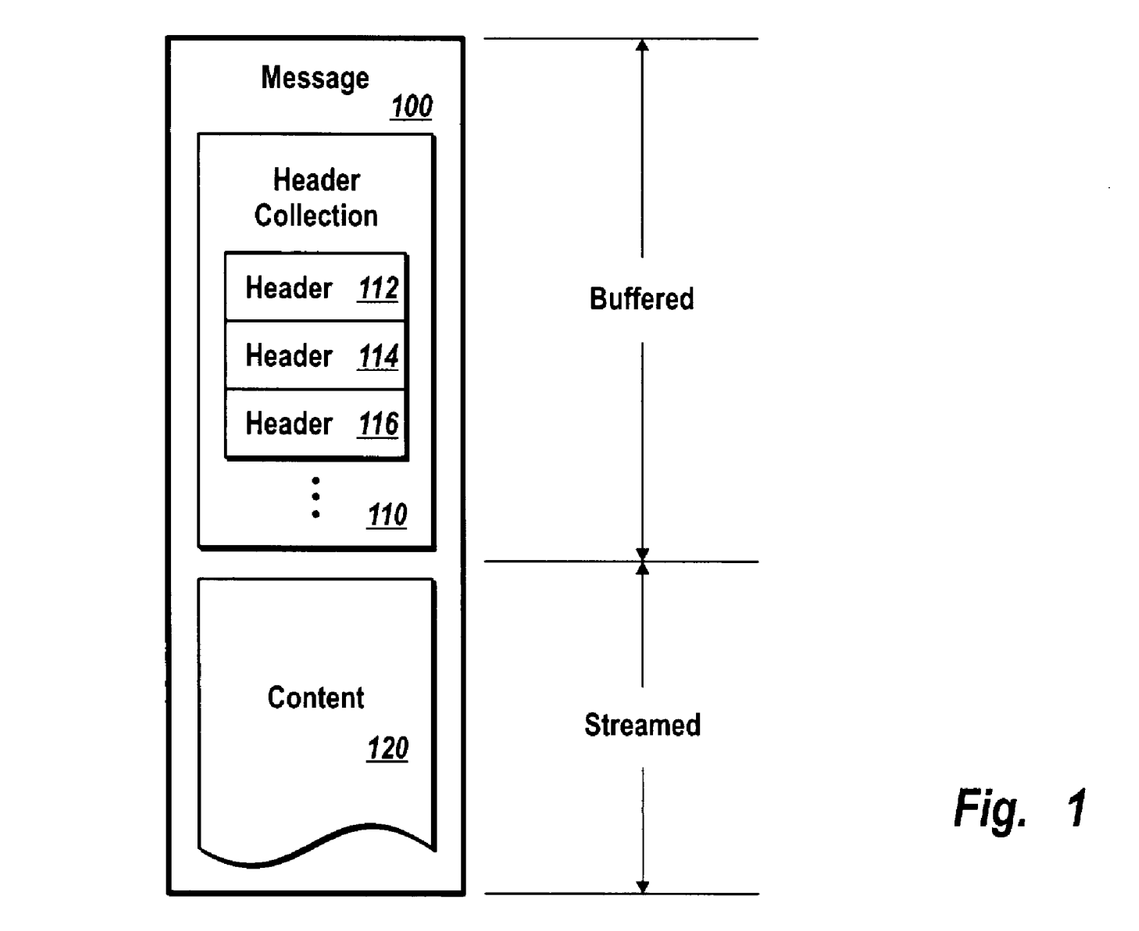
FIG. 1 illustrates an example message for processing by a messaging system in accordance with the present invention.

FIG. 1 illustrates an example message object 100 for processing by a messaging system in accordance with the present invention. A message is the fundamental unit of communication between endpoints. Message object 100 includes a header collection 110 that contains header 112, header 114, header 116, and potentially others. Message object 100 also includes content 120. As shown, the header collection 110 of message object 100 is buffered, whereas content 120 is streamed. One motivation for buffering headers of a message object is that headers are typically used when deciding what to do with a message, prior to actually doing it. For example, in order to route message object 100 to an appropriate endpoint, it is typically necessary to examine certain headers. Routing, however, typically does not require examining the content. Accordingly, streaming the content 120 and buffering headers for convenience may be appropriate under some circumstances.

Of course, buffering header collection 110 and streaming content 120 is only one example message layout. Because headers are relatively small and fairly well defined, they do not present the unbounded buffer requirements found with message content. Nevertheless, nothing in the present invention excludes streaming all of message object 100, including header collection 110. Furthermore, it should be emphasized that the layout of message object 100 is only one of many possible layouts. Although message objects 100 often will include a separate header collection 110 and content or body 120, the present invention is not limited to any particular message layout, and any references to particular message layouts should be considered only as examples.

The layout of message object 100 generally corresponds to a Simple Object Access Protocol (SOAP) message. SOAP is a lightweight messaging protocol based on eXtensible Markup Language (XML) that is used to encode information in web service request and response messages prior to sending them over a network. SOAP messages are well-suited to web services because they are operating system independent and may be transported and encoded using any of various Internet protocols, such as Simple Mail Transfer Protocol (SMTP), HyperText Transfer Protocol (HTTP), Multipurpose Internet Mail Extensions (MIME), Direct Internet Mail Encapsulation (DIME), etc.

A general purpose SOAP message processor needs to have access to at least certain headers present in the message in order to determine its correct processing. As described in more detail below, in an example embodiment a pipeline of message handlers may be used to process a message. Each of these handlers may inspect and operate on zero or more of the headers present in the message. (Handlers also may inspect and operate on the streamed message content.) The combined action of these handlers defines the processing that will affect the message. Once the SOAP processor has completed its job, it passes the message on to the target recipient of the message.

Note, however, that at this state the SOAP processor did not need to materialize the complete message in buffers to perform the correct processing of the message. In particular, a SOAP processor need only have access to particular header elements and perhaps even some body elements, but need not have access to others. Accordingly, in the example embodiments described below, various headers of a SOAP message may be buffered, whereas the body of a SOAP message is buffered only when required. Producing the body of a SOAP message only when needed is accomplished essentially by passing a reference to the body and allowing consumers to pull the contents on-demand.

In an example embodiment, the message header collection 110 has a find method for finding individual headers within the header collection. Find is commonly used by header-specific message handlers to retrieve the appropriate header, either by the type of header, the XML element name of the header, the XML namespace in which the header is defined, and/or the actor/role corresponding to the endpoint for which the header is targeted. All headers are buffered for simplicity within the constraints of available memory, but as indicated above, nothing in the present invention precludes streaming one or more headers, if appropriate for a particular implementation. To further guard against denial of service attacks, a memory quota, for example 32 k bytes, may be established for buffering headers.

Figure 2A:
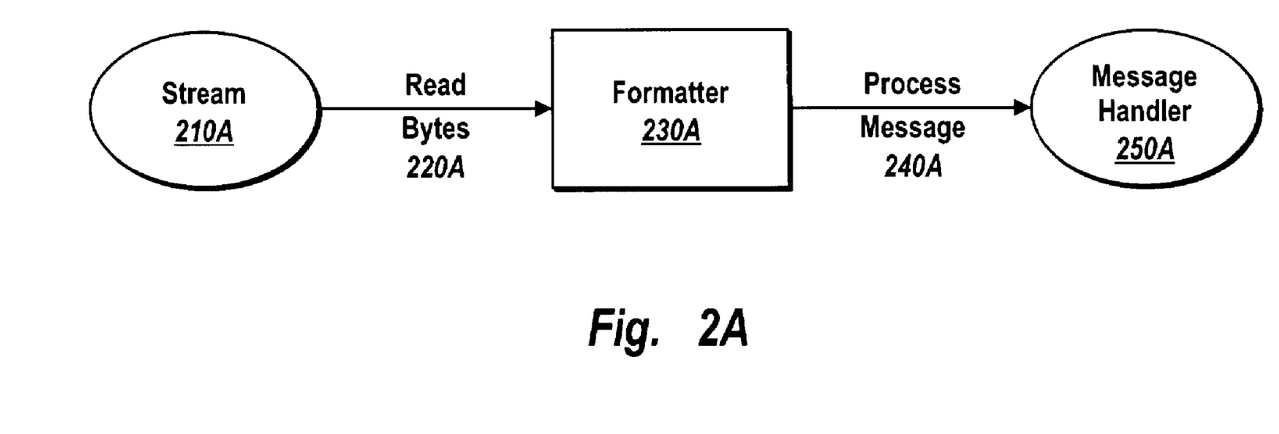
FIG. 2A shows an example of reading a message object from a stream.
Figure 2B:
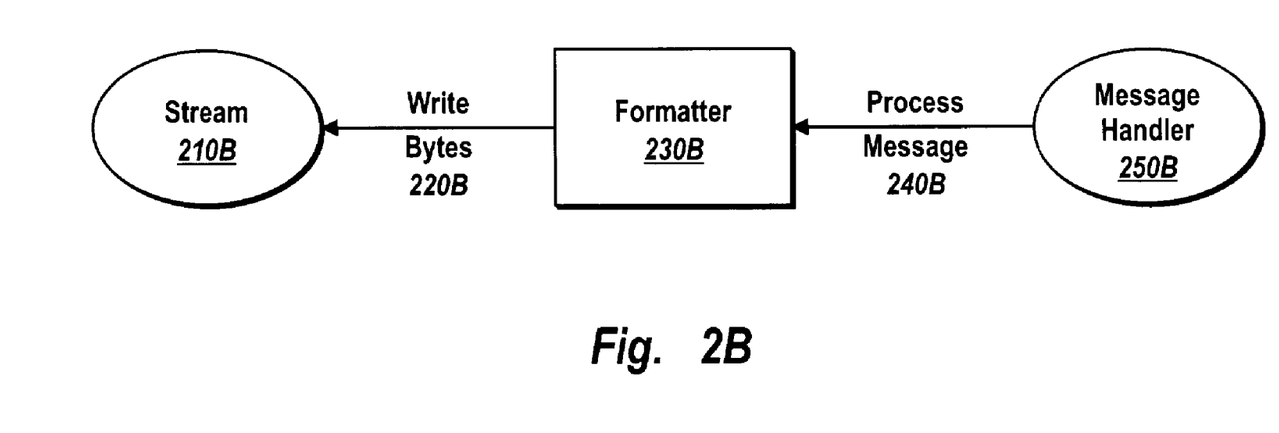
FIG. 2B shows an example of writing a message object to a stream.

FIGS. 2A–2B show examples of reading a message object from and writing a message object to a stream. Formatters 230A and 230B convert between a stream representation of the message and the in-memory message instance. When a message is received over the network from another endpoint, formatter 230A reads 220A from stream 210A and calls 240A a message handler 250A to process the message. Similarly, when a message is sent over the network to another endpoint, formatter 230B writes 220B from the in-memory instance produced by message handler 250B to stream 210B. As described above, typically message handlers 250A and 250B will be one or more pipelines of message handlers.

Figure 3A:
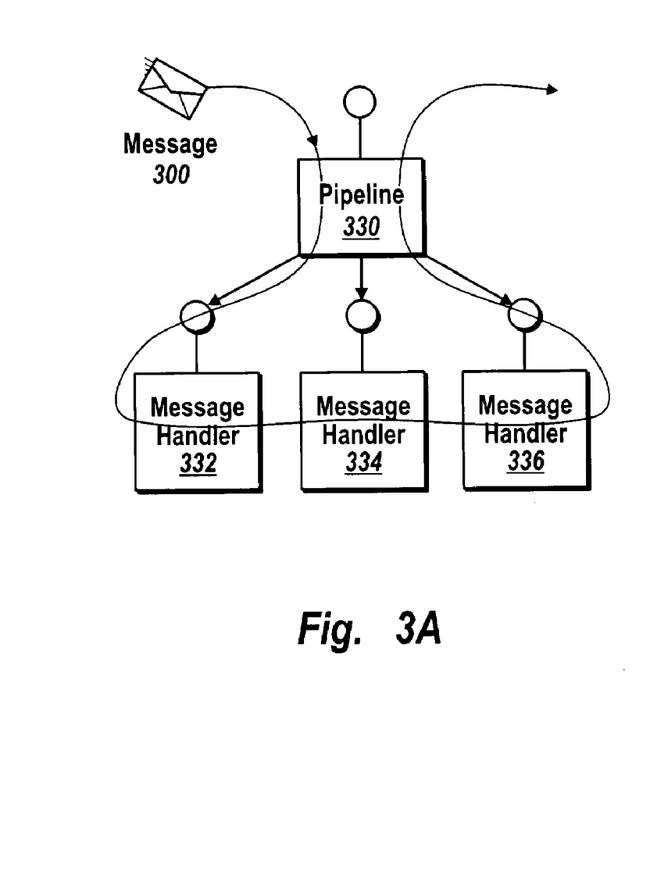
FIG. 3A illustrates an example pipeline for processing a message object.
Figure 3B:
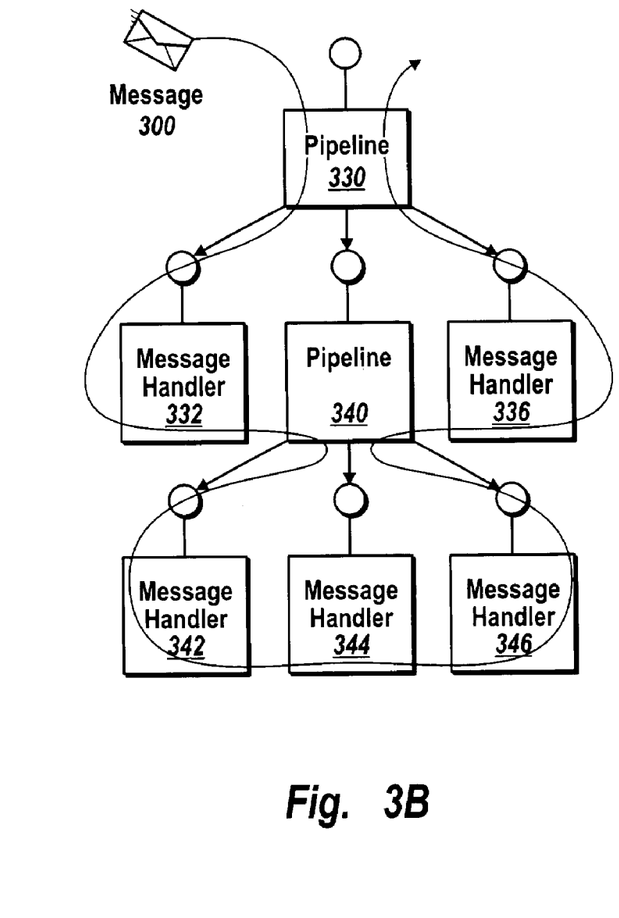
FIG. 3B illustrates a nested pipeline example for message object processing.

FIGS. 3A–3B illustrate example pipelines for processing a message object. Sequential execution of message handlers is a common message processing pattern. Pipelines simplify the management of asynchronous code message handlers. A pipeline is a message handler and can be used anywhere a message handler can be used. Pipelines contain an ordered collection of message handlers. In FIG. 3A, pipeline 330 includes message handler 332, message handler 334, and message handler 336. When pipeline 330 is called to process message 300, the pipeline calls each message handler in its collection, one at a time, in order, to process the message. The effect a message pipeline has on streamed content will be described in more detail below.

Since a pipeline is a message handler, pipelines may be nested as illustrated in FIG. 3B. As described above in connection with FIG. 3A, when a pipeline is called to process a message 300, the message goes through each handler in the pipeline (unless an error occurs or a handler decides further processing should be suspended). If one of the handlers in the pipeline is a pipeline itself, as shown in FIG. 3B, the message goes through each of those handlers, and so on. In FIG. 3B, pipeline 330 has three message handlers: message handler 332, pipeline 340, and message handler 336. Pipeline 340 also has three message handlers: message handler 342, message handler 344, and message handler 346. The order handlers are called is indicated by the line. If a message handler, such as message handler 344, indicates that no further message processing should occur, neither message handler 346 nor message handler 336 would be called. Of course, the pipelines illustrated in FIGS. 3A–3B are examples of relatively simple pipelines and it should be understood that much more complicated pipelines may be used.

Figure 4:
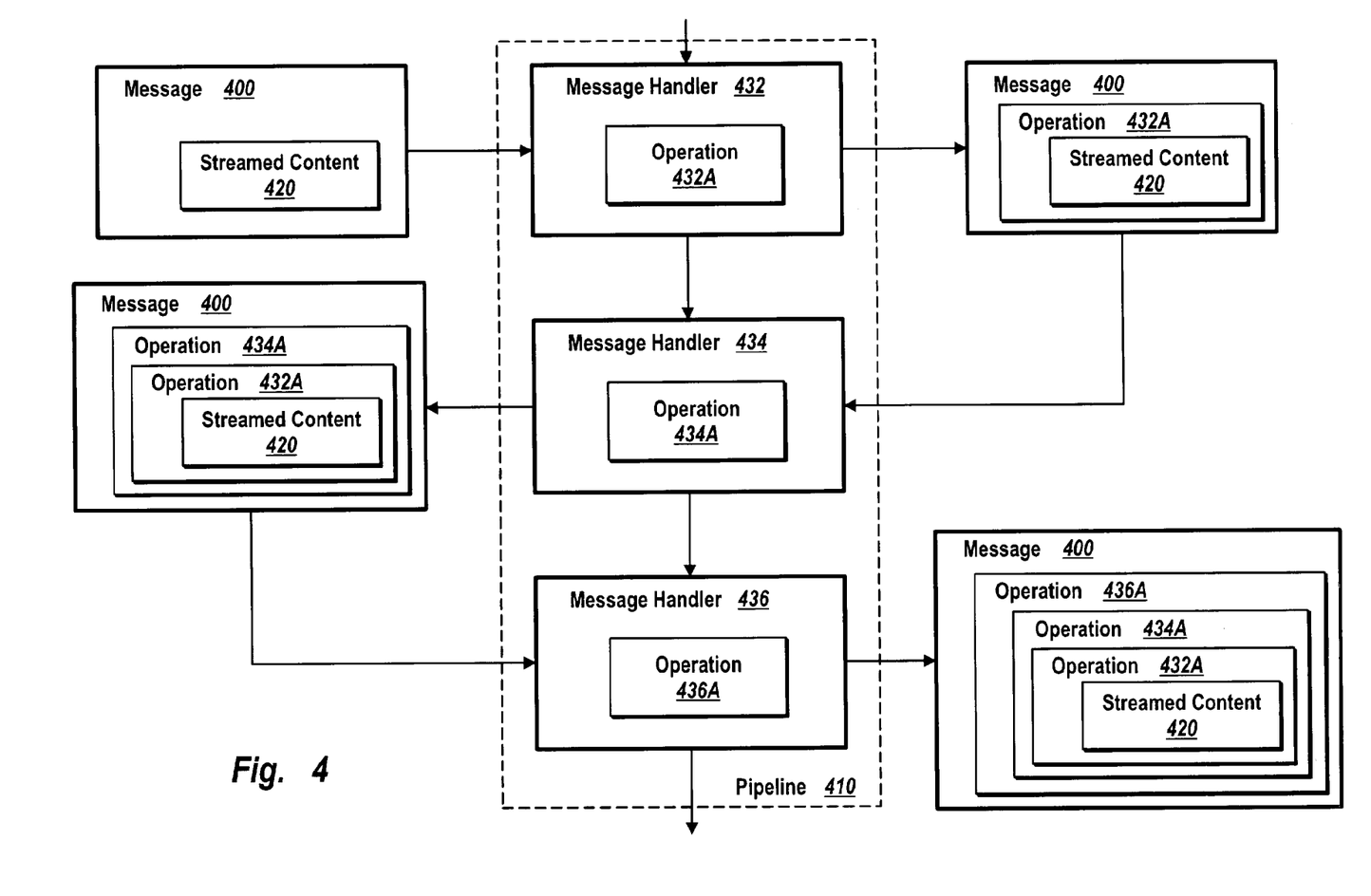
FIG. 4 illustrates wrapping or encapsulating the streamed message content of a message object.

FIG. 4 illustrates wrapping or encapsulating the streamed message content of a message object. For streamed message content, message handlers, such as the message handlers illustrated in FIGS. 3A–3B, wrap or encapsulate the streamed message content with the message handler's processing operation. Wrapping or encapsulating occurs, because to perform the processing operation on the streamed message content at the point when the message handler is called would require buffering or materializing the streamed message content, which would defeat the purpose of having the message content as a stream.

As shown in FIG. 4, streamed message content 420 of message 400 is wrapped or encapsulated with various processing operations as it passed through pipeline 410. Message handler 432 encapsulates streamed message content 420 with processing operation 432A. Message handler 434 wraps streamed content 420 and processing operation 432A, with processing operation 434A. Finally, message handler 436 encapsulates streamed content 420, processing operation 432A, and processing operation 434A with processing operation 436A.

With these processing operations layered on the streamed content, when a consumer begins to access the streamed content, the appropriate processing operation will be performed, ordered as the message handlers are called in pipeline 410, without having to materialize the streamed content. As a result, the buffer requirements for processing message 400 are reduced, which allows a messaging system to send or receive relatively larger messages using a given buffer size. As indicated above, the layered processing also makes the messaging system less vulnerable to denial of service attacks based on large messages because the messaging system can perform much of the required processing without having to materialize the content, which is particularly beneficial if the messaging system performs a routing function as described below with respect to FIGS. 5A–5C. It should be noted that some buffering of the streamed content will likely occur as portions or chunks of the stream are accessed, but this buffering is bounded because it is based on the chunk size, rather than the entire stream. At its final destination and at intermediaries, the received stream content simply can be written to another stream, such as a disk at the final destination or a stream for the next hop.

At this stage, it may be helpful to discuss FIG. 4 in terms of two more concrete examples. Suppose that pipeline 410 is preparing streamed content 420 for a message 400 to be written. Message handler 432 includes a digital signature operation 432A, message handler 434 includes an encryption operation 434A, and message handler 436 includes a compression operation 436A. As message 400 passes through pipeline 400, the digital signature operation 432A, encryption operation 434A, and compression operation 436A are layered on top of, encapsulate, or wrap streamed content 420. Accordingly, when streamed content 420 is written for transport, streamed content 420 provides portions or chunks of the stream, which are digitally signed with digital signature operation 432A, encrypted by encryption operation 434A, and compressed with compression operation 436A. What gets written, therefore, is a signed, encrypted, compressed version of streamed content 420.

Conversely, suppose that pipeline 410 is preparing streamed content 420 for a message 400 to be read. In the read case, the ordering of the message handlers in pipeline 410 is reversed from the write example above. Message handler 432 includes a decompression operation 432A, message handler 434 includes a decryption operation 434A, and message handler 436 includes a digital signature verification operation 436A. As message 400 passes through pipeline 400, the decompression operation 432A, decryption operation 434A, and digital signature verification operation 436A are layered on top of, encapsulate, or wrap streamed content 420.

Accordingly, when streamed content 420 is read, streamed content 420 provides portions or chunks of the stream, which are decompressed with decompression operation 432A, decrypted by decryption operation 434A, and the digital signature is verified with digital signature verification operation 436A. What gets read, therefore, is a decompressed, decrypted, digital signature verified version of the signed, encrypted, compressed streamed content 420. The layering or encapsulation that occurs in pipeline 410 may be implemented as a series of callback functions for the objects that correspond to the processing operations within each message handler. In other words, initially we start with a stream, then the decompression operation makes the stream a decompressed stream, the decryption operation makes the stream a decrypted, decompressed stream, and the digital signature operation makes the stream a verified, decrypted, decompressed stream, which is precisely what is needed for the signed, encrypted, compressed stream that was received. As each operation is performed, the corresponding object keeps track of what the previous operation was to form a chain of callbacks. This is only one possible implementation for encapsulating or wrapping processing operations—many other implementations are possible and should be considered within the scope of encapsulating, wrapping, and/or layering.

Figure 5A:
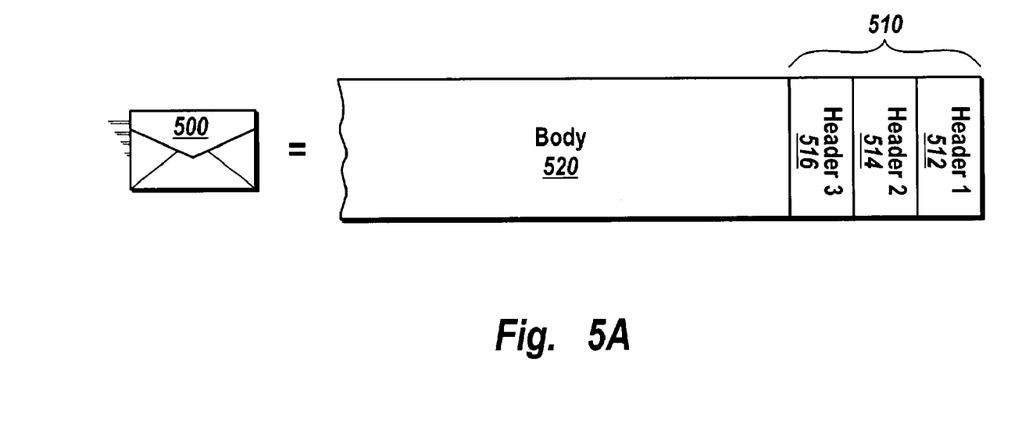
FIGS. 5A–5C show an example of routing a message object.
Figure 5B:
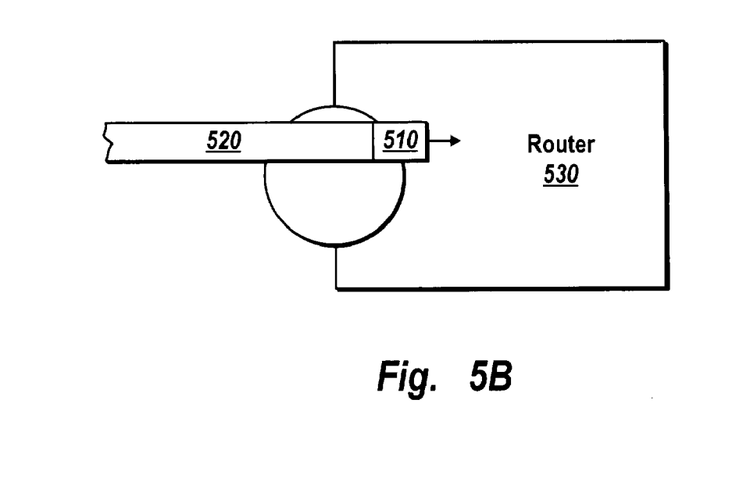
Figure 5C:
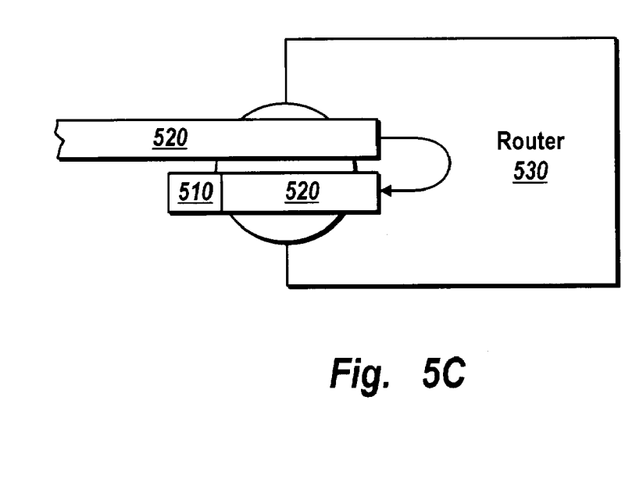

FIGS. 5A–5C show an example of routing a message object 500. FIG. 5A is similar to FIG. 1, in that message object 500 includes a collection of headers 510 that contains header 1 512, header 2 514, and header 3 516, and body 520. In FIG. 5B, when message object 500 reaches router 530, router 530 looks at the collection of headers 510 to determine how the message should be routed. Note that as discussed above, the body portion 520 of the message object does not need to be materialized for routing, but can be wrapped. Then, as shown in FIG. 5C, the collection of headers 510 and body 520 are routed appropriately. By having wrapped message body 520, the stream read at router 530 can be written back out to the routed stream, without having been materialized. Therefore, the buffer requirements for the router are reduced, allowing router 530 to process relatively larger messages for a given buffer size, and making router 530 more resilient to denial of service attacks.

Figure 6:
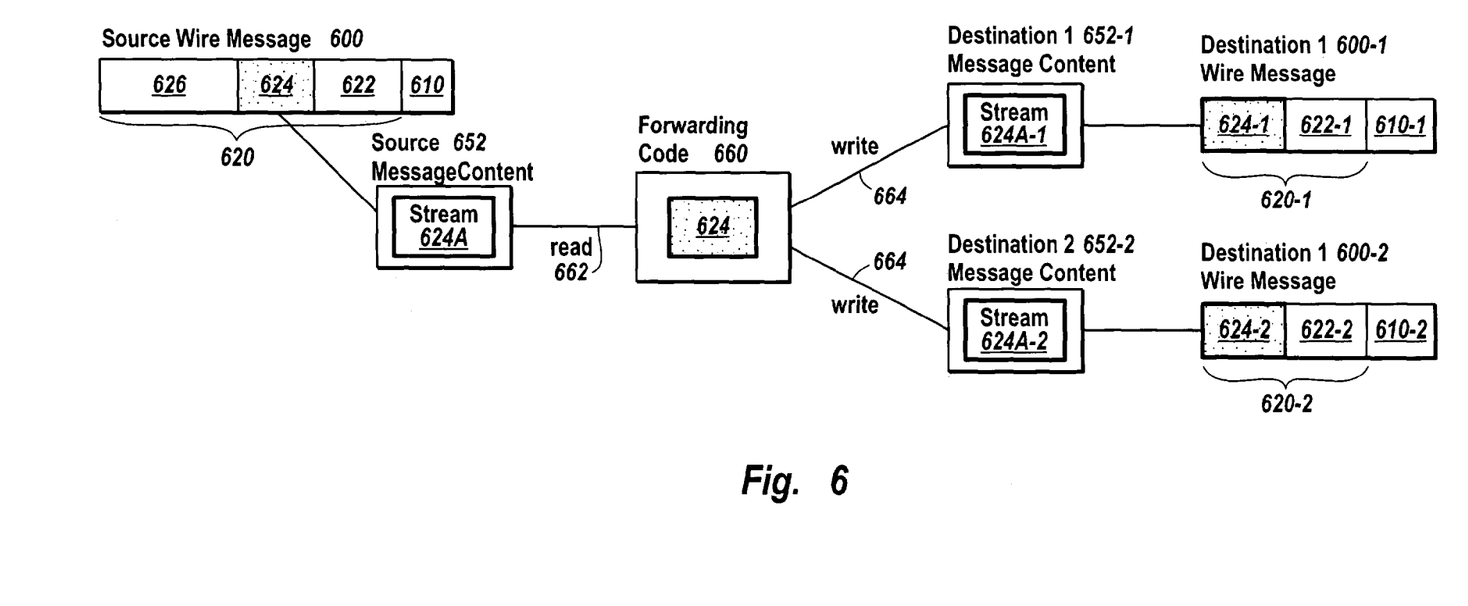
FIG. 6 illustrates an example of duplicating a message object without having to buffer the streamed portion.

FIG. 6 illustrates an example of duplicating a message object without having to buffer the streamed portion, for example, in sending a message object to multiple destinations. One of the implications of having a stream based model is that the same message object cannot be sent twice. Forwarding code 660 allows a received message to be sent, and automatically performs the work needed to build new message(s).

Again, similar to FIG. 1, source wire message 600 includes a collection of headers 610, and a streamed body 620. The collection of headers 610 and a portion 622 of the streamed body 620 have already been processed by forwarding code 660. Notice that destination 1 wire message 600-1 includes a copy of header collection 610 and body portion 622, designated as header collection 610-1 and body portion 622-1. Likewise, destination 2 wire message 600-2 also includes a copy of header collection 610 and body portion 622, which are designated as header collection 610-2 and body portion 622-2.

A chunk 624 of body 620 appears as a stream 624A to forwarding code 660. Forwarding code 660 reads from stream 624A to again form chunk 624 within the forwarding code 624. Note that forwarding code 660 buffers chunk 624 of body 620. However, as indicated above, buffering a chunk of a stream represents a bounded buffer size, as opposed to buffering all of body 620 which would represent an unbounded buffer. Forwarding code 660 writes 664 chunk 624 to destination 1 message content 652-1 and destination 2 message content which appears as stream 624A-1 and 624A-2, respectively. Streams 624A-1 and 624A-2 are then written as chunks 624-1 and 624-2 at destination 1 wire message 600-1 and destination 2 wire message 600-2. When forwarding code 660 has processed all of source wire message 600, both destination 1 and destination 2 will have a copy.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 7A:
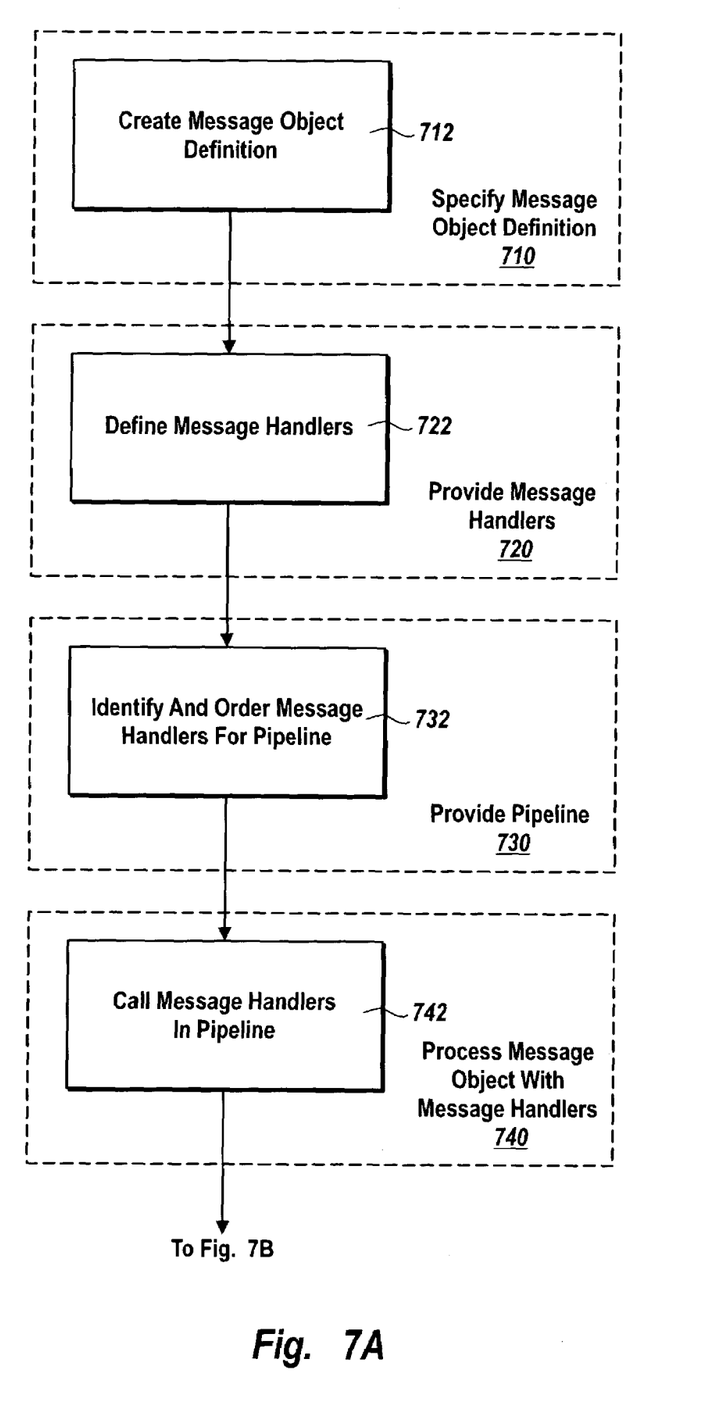
FIGS. 7A–7B show example acts and steps for methods of processing a message object that reduce buffer requirements in accordance with the present invention.
Figure 7B:
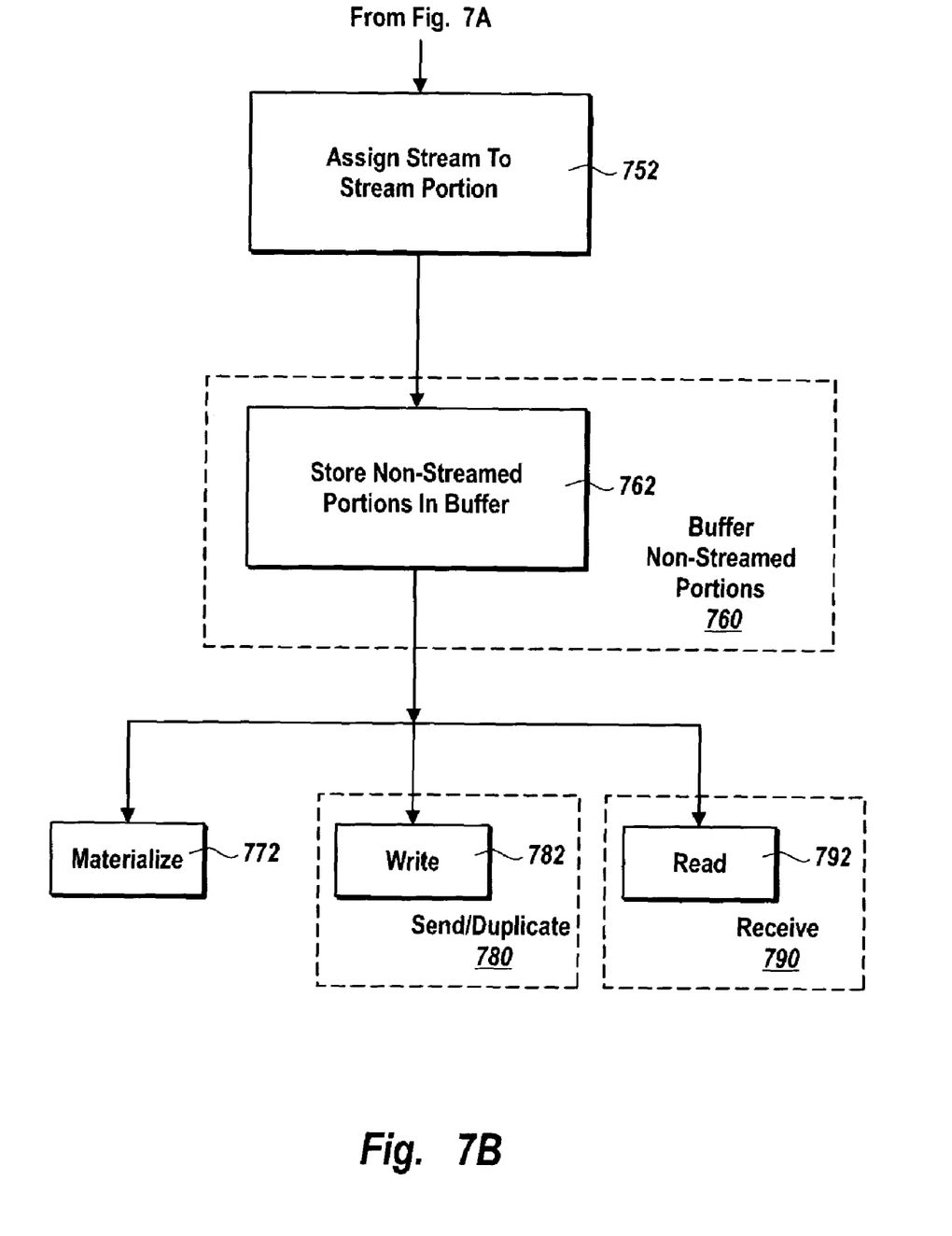

FIGS. 7A–7B show example acts and steps for methods of processing a message object that reduce buffer requirements in accordance with the present invention. A step for specifying (710) an object definition for the message object may comprise an act of creating (712) a message object definition for the message object that defines at least one streamed portion and a corresponding stream oriented interface. A step for providing (720) one or more message handlers, each of which identifies a corresponding processing operation to perform on the message object may comprise an act of defining (722) the one or more message handlers. A step for providing (730) a message pipeline comprising an ordered collection of one or more message handlers may comprise an act of identifying and ordering (732) the one or more message handlers to be included in a configurable pipeline.

A step for processing (740) the message object with the one or more message handlers of the message pipeline such that at least one message handler encapsulates a streamed portion of the message object, may include an act of calling (742) the one or more message handlers. An example method according to the present invention may include an act of assigning (752) a stream to the stream portion of the message object. As indicated above, the assignment may occur after calling the one or more message handlers of the message pipeline.

A step for buffering (760) one or more non-stream portion of the message object may include an act of storing (762) the one or more non-stream portions in a buffer. A step for receiving (790) a message object from another endpoint or an intermediary, may include an act of reading (792) the message object from a message transport stream. A step for sending (780) a message object to another endpoint or duplicating (780) the message object for delivery to a plurality of endpoints may include an act of writing (782) the message object to a message transport stream. Note that both reading and writing may cause the processing operations from the message handlers to be performed on the streamed portion of the message object. An example method according to the present invention may further include an act of materializing (772) the streamed portion of a message object on demand.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 8:
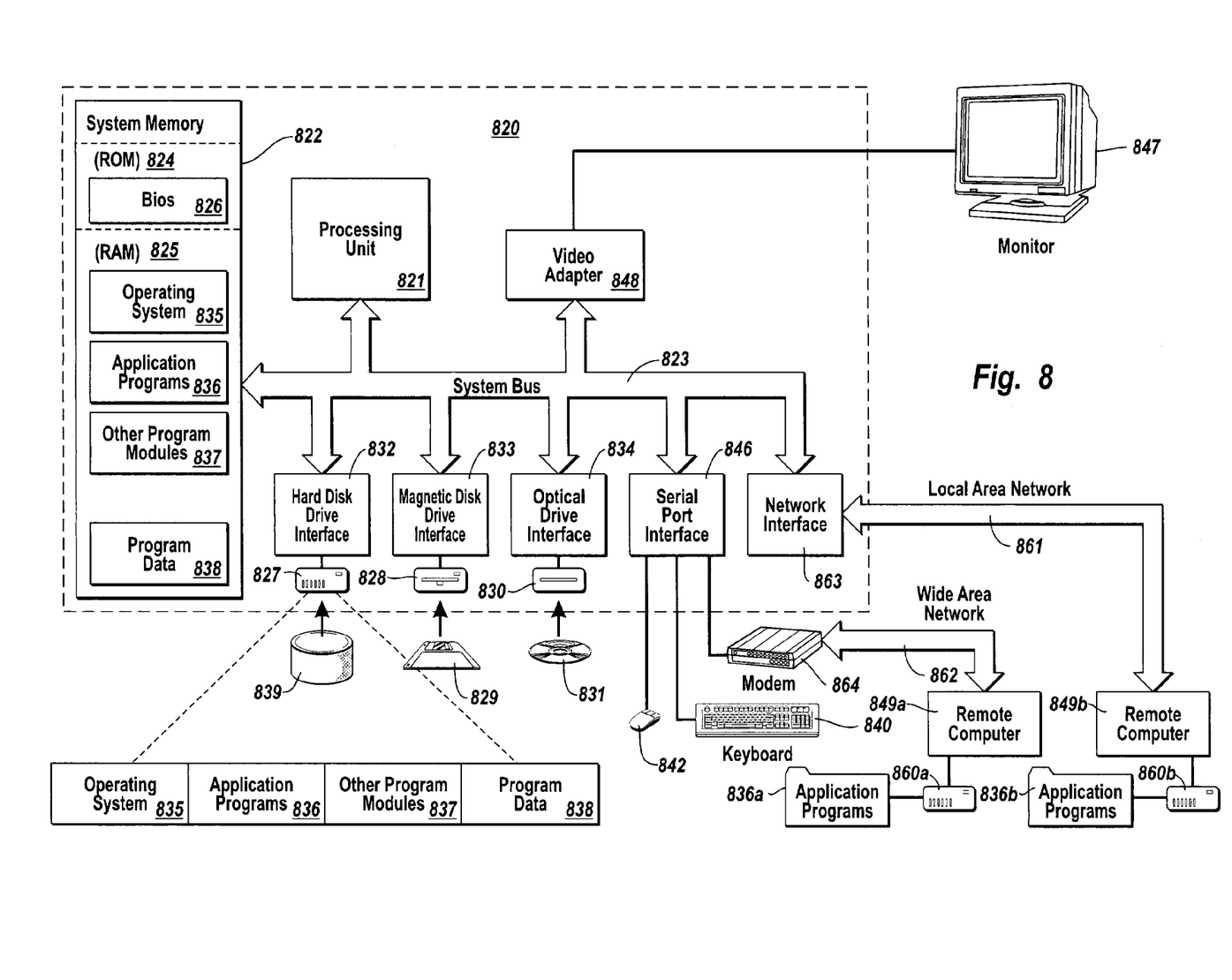
FIG. 8 illustrates an example system that provides a suitable operating environment for the present invention.

FIG. 8 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 8, an example system for implementing the invention includes a general purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD-ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a messaging system with a given buffer size for sending or receiving messages via one or more message transports, a method of processing a message that reduces buffer requirements for at least a portion of the message, thereby allowing the messaging system to send or receive relatively larger messages using the given buffer size, the method comprising acts of:

defining one or more message handlers, each identifying a corresponding processing operation to perform on a message object that comprises at least one streamed portion having a stream oriented interface;

identifying and ordering one or more message handlers to be included in at least one of a plurality of message pipelines, at least one of the message pipelines being nested in another message pipeline; and     calling the one or more message handlers of each message pipeline to process the message object, wherein at least one message handler wraps the at least one streamed portion of the message object with its corresponding processing operation which is to be performed at a future time, without materializing the at least one streamed portion of the message object in a buffer.

2. A method as recited in claim 1, wherein one or more of the message pipelines comprises a plurality of message handlers, and wherein each of the plurality of message handlers successively wraps the at least one streamed portion of the message object with its corresponding processing operation, such that a plurality of processing operations are layered on the at least one stream portion of the message object.

3. A method as recited in claim 1, wherein the message object comprises one or more header portions and at least one body portion, and wherein the body portion comprises the at least one streamed portion of the message object.

4. A method as recited in claim 3, wherein the message object comprises a simple object access protocol (SOAP) message object.

5. A method as recited in claim 4, wherein the messaging system is an intermediary responsible for routing the message object.

6. A method as recited in claim 5, wherein the intermediary materializes at least one header for routing the message without having to materialize the at least one streamed portion of the message object.

7. A method as recited in claim 1, wherein the messaging system is an endpoint, the method further comprising an act of writing the message object to a message transport stream, wherein the act of writing the message object to the transport stream causes the at least one processing operation to be performed on the at least one streamed portion of the message object.

8. A method as recited in claim 1, wherein the messaging system comprises a message consumer, the method further comprising an act of the message consumer materializing the at least one streamed portion of the message object on demand.

9. A method as recited in claim 8, wherein materializing the at least one streamed portion of the message object on demand comprises passing a reference to the streamed portion.

10. A method as recited in claim 1, further comprising an act of creating a message object definition for the message object, the message object definition defining the at least one streamed portion and the corresponding stream oriented interface for the message object.

11. For a messaging system with a given buffer size for sending or receiving messages via one or more message transports, a computer program product comprising one or more computer readable media carrying computer executable instructions that implement a method of processing a message that reduces buffer requirements for at least a portion of the message, thereby allowing the messaging system to send or receive relatively larger messages using the given buffer size, the method comprising acts of:

defining one or more message handlers, each identifying a corresponding processing operation to perform on a message object that comprises at least one streamed portion having a stream oriented interface;

identifying and ordering one or more message handlers to be included in at least one of a plurality of message pipelines, at least one of the message pipelines being nested in another message pipeline; and     calling the one or more message handlers of each message pipeline to process the message object, wherein at least one message handler wraps the at least one streamed portion of the message object with its corresponding processing operation which is to be performed at a future time, without materializing the at least one streamed portion of the message object in a buffer.

12. A computer program product as recited in claim 11, wherein one or more of the message pipelines comprises a plurality of message handlers, and wherein each of the plurality of message handlers successively wraps the at least one streamed portion of the message object with its corresponding processing operation, such that a plurality of processing operations are layered on the at least one stream portion of the message object.

13. A computer program product as recited in claim 11, wherein the message object comprises one or more attachment portions.

14. A computer program product as recited in claim 11, wherein calling the one or more message handlers of the message pipeline occurs prior to a stream being assigned to the at least one stream portion of the message object.

15. A computer program product as recited in claim 11, wherein the messaging system is an endpoint, the method further comprising an act of reading the message object from a message transport stream, wherein the act of reading the message object to the transport stream causes the at least one processing operation to be performed on the at least one streamed portion of the message object.

16. A computer program product as recited in claim 11, wherein the message object comprises one or more non-streamed portions, the method further comprising an act of storing the one or more non-stream portions in a buffer.

17. A computer program product as recited in claim 11, wherein the messaging system comprises a message consumer, the method further comprising an act of the message consumer materializing the at least one streamed portion of the message object on demand.

18. A computer program product as recited in claim 11, the method further comprising an act of writing the message object to a plurality of transport streams for delivery to a plurality of endpoints, without materializing the at least one streamed portion of the message object in a buffer.

19. In a messaging system with a given buffer size for sending or receiving messages via one or more message transports, a method of processing a message that reduces buffer requirements for at least a portion of the message, thereby allowing the messaging system to send or receive relatively larger messages using the given buffer size, the method comprising steps for:

providing one or more message handlers, each identifying a corresponding processing operation to perform on a message object that comprises at least one streamed portion having a stream oriented interface;

providing a first message pipeline comprising an ordered collection of the one or more message handlers, the first message pipeline being nested within a second message pipeline; and processing the message object with the one or more message handlers of the first message pipeline, wherein at least one message handler encapsulates the at least one streamed portion of the message object with its corresponding processing operation, without materializing the at least one streamed portion of the message object in a buffer.

20. A method as recited in claim 19, wherein the step for providing a first message pipeline comprises acts of identifying and ordering the one or more message handlers.

21. A method as recited in claim 19, wherein the first message pipeline comprises a plurality of message handlers, and wherein each of the plurality of message handlers successively wraps the at least one streamed portion of the message object with its corresponding processing operation, such that a plurality of processing operations are layered on the at least one stream portion of the message object.

22. A method as recited in claim 19, wherein the message object comprises one or more attachment portions.

23. A method as recited in claim 19, wherein calling the one or more message handlers of the first message pipeline occurs prior to a stream being assigned to the at least one stream portion of the message object.

24. A method as recited in claim 19, wherein the messaging system is an endpoint, the method further comprising a step for receiving the message object from another endpoint or an intermediary, wherein the step for receiving the message object causes the at least one processing operation to be performed on the at least one streamed portion of the message object.

25. A method as recited in claim 19, wherein the message object comprises one or more non-streamed portions, the method further comprising a step for buffering the one or more non-streamed portions.

26. A method as recited in claim 19, wherein the messaging system comprises a message consumer, the method further comprising an act of the message consumer materializing the at least one streamed portion of the message object on demand.

27. A method as recited in claim 19, further comprising a step for duplicating the message object for delivery to a plurality of endpoints, without materializing the at least one streamed portion of the message object in a buffer.

28. A method as recited in claim 19, the method further comprising a step for processing the message object with each of the one or more message handlers of each message pipeline.

29. For a messaging system with a given buffer size for sending or receiving messages via one or more message transports, a computer program product comprising one or more computer readable media carrying computer executable instructions that implement a method of processing a message that reduces buffer requirements for at least a portion of the message, thereby allowing the messaging system to send or receive relatively larger messages using the given buffer size, the method comprising steps for:

providing one or more message handlers, each identifying a corresponding processing operation to perform on a message object that comprises at least one streamed portion having a stream oriented interface;

providing a first message pipeline comprising an ordered collection of the one or more message handlers, the first message pipeline being nested within a second message pipeline; and processing the message object with the one or more message handlers of the first message pipeline, wherein at least one message handler encapsulates the at least one streamed portion of the message object with its corresponding processing operation, without materializing the at least one streamed portion of the message object in a buffer.

30. A computer program product as recited in claim 29, wherein the step for providing a first message pipeline comprises acts of identifying and ordering the one or more message handlers.

31. A computer program product as recited in claim 29, wherein the first message pipeline comprises a plurality of message handlers, and wherein each of the plurality of message handlers successively wraps the at least one streamed portion of the message object with its corresponding processing operation, such that a plurality of processing operations are layered on the at least one stream portion of the message object.

32. A computer program product as recited in claim 29, wherein the message object comprises one or more header portions and at least one body portion, and wherein the body portion comprises the at least one streamed portion of the message object.

33. A computer program product as recited in claim 32, wherein the message object comprises a simple object access protocol (SOAP) message object.

34. A computer program product as recited in claim 33, wherein the messaging system is an intermediary responsible for routing the message object.

35. A computer program product as recited in claim 34, wherein the intermediary materializes at least one header for routing the message without having to materialize the at least one streamed portion of the message object.

36. A computer program product as recited in claim 29, wherein the messaging system is an endpoint, the method further comprising a step for sending the message object to another endpoint, wherein the step for sending the message object causes the at least one processing operation to be performed on the at least one streamed portion of the message object.

37. A computer program product as recited in claim 29, wherein the messaging system comprises a message consumer, the method further comprising an act of the message consumer materializing the at least one streamed portion of the message object on demand.

38. A computer program product as recited in claim 29, the method further comprising a step for specifying a message object definition for the message object, the message object definition defining the at least one streamed portion and the corresponding stream oriented interface for the message object.

39. A computer program product as recited in claim 29, the method further comprising a step for processing the message object with each of the one or more message handlers of each message pipeline.

* * * * *